Patented Dec. 7, 1948

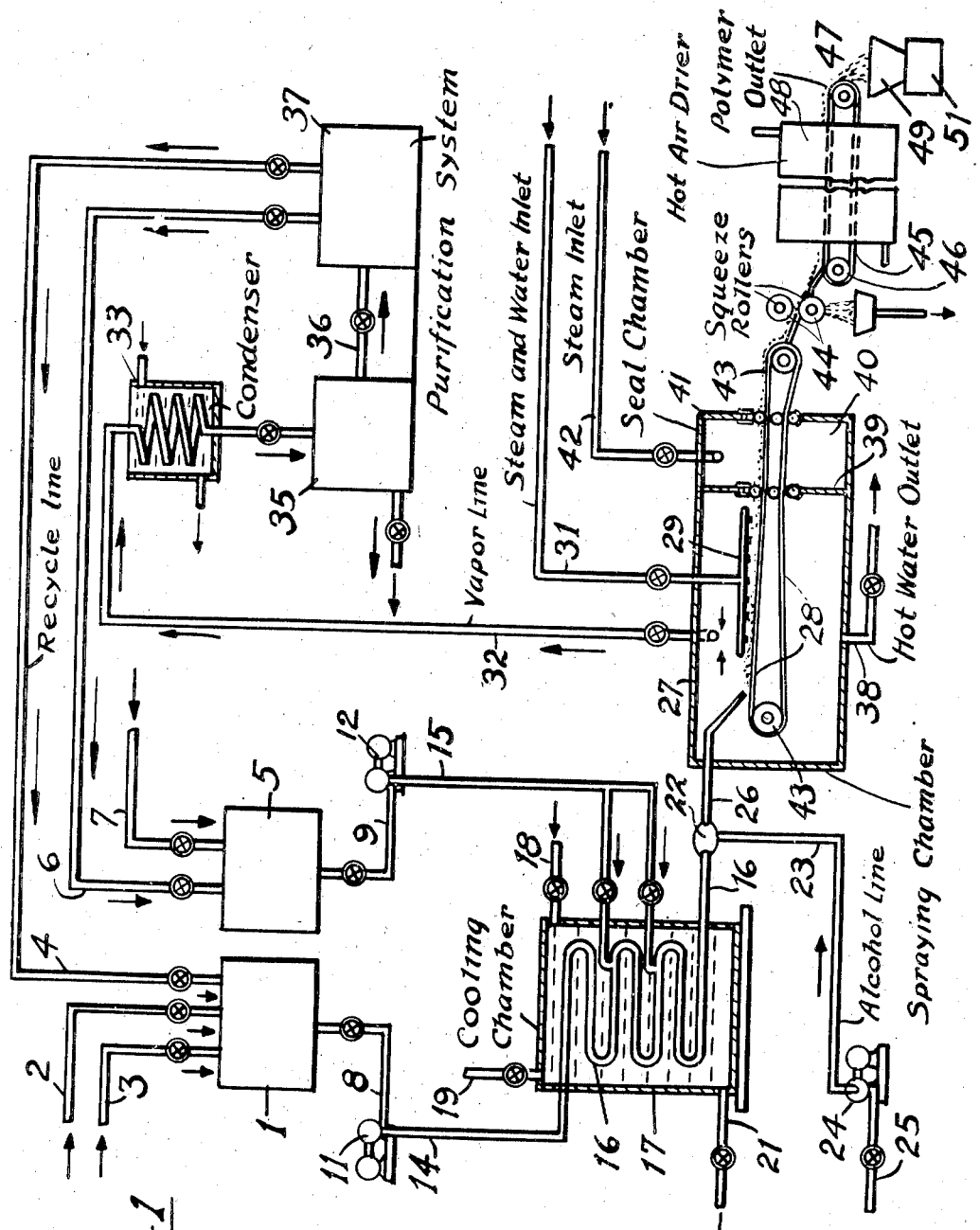

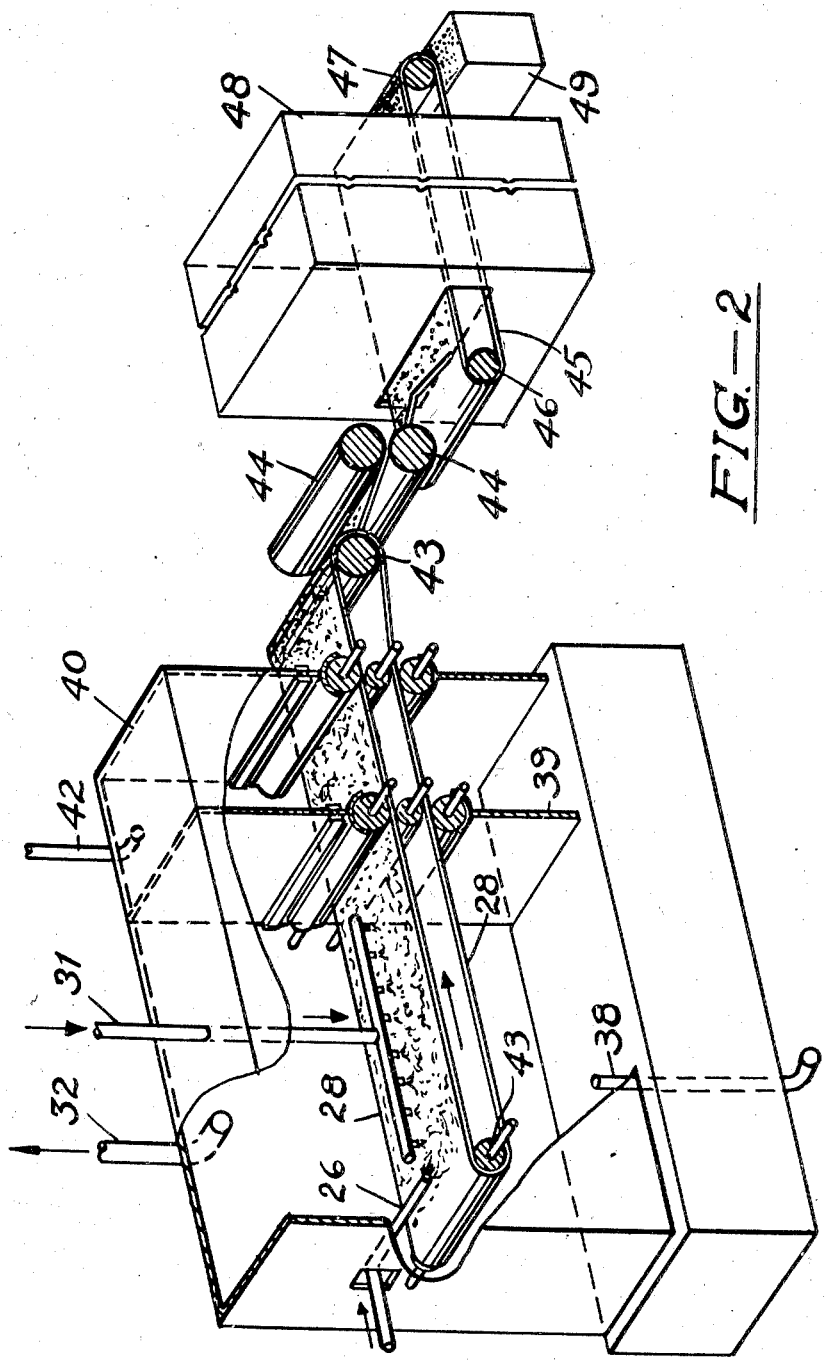

2,455,671

UNITED STATES PATENT OFFICE 2,455,671

PROCESS FOR THE MANUFACTURE OF HIGH MOLECULAR WEIGHT POLYMERS

Arthur Donald Green, Cranford, N. J., assignor, by mesne assignments, to Jasco, Incorporated, a corporation of Louisiana Original application September 19, 1941, Serial No. 411,440. Divided and this application July 6, 1944, Serial No. 543,680

7 Claims. (Cl. 260—93)

This invention relates to polymerization processes and apparatus, relates particularly to continuous low temperature polymerization processes; and relates especially to the separation of the solid polymer from the liquid and gaseous reaction mixture components without loss of gaseous materials.

Isobutylene and many other olefins polymerize readily either alone, or with other olefins or diolefins, into very high molecular weight polymer substances in the presence of Friedel-Crafts type catalysts at low temperatures, and the polymeric materials are finding many important uses. To the present, however, the material has usually been prepared by a batch process in which a reactor vessel is filled with the olefinic material, which may be isobutylene alone or may be isobutylene mixed with varying proportions of a diolefin such as butadiene, isoprene, pentadiene, dimethyl butadiene or other diolefins and homologues thereof, or may consist of other simple olefins or mixtures of the other simple olefins with the diolefins, together with a suitable diluent-refrigerant such as liquid ethylene or a refrigerant such as solid carbon dioxide, with or without an auxiliary diluent such as ethyl chloride or other low freezing substances. The refrigerant preferably cools the mixture to a temperature below 0° C., and usually below —10° C. to —140° C. or to —165° C. and preferably to a temperature ranging between —78° C. and —120° C. or even lower to —165° C.

To the cooled mixture there is then added a suitable Friedel-Crafts type catalyst such as a gaseous boron trifluoride; or a dissolved active metal halide such as aluminum chloride in solution in a low freezing solvent such as ethyl or methyl chloride, or carbon disulfide, or propyl chloride if ultra low temperatures are not desired, or other suitable solvent which will dissolve from about one-half per cent to several per cent of the active metal halide. The polymerization reaction proceeds quickly, and may reach completion, or the desired percentage of completion in a time interval ranging from a fraction of a minute to about ten minutes, depending in part upon the temperature and in part upon the strength and efficiency of the catalyst used, as well as the purity of the reacting substances.

In the past, when the reaction had reached the desired stage, the reactor was dumped and the desired solid polymer recovered from the reaction mixture. This procedure, however, is time consuming and expensive, involving the sudden vaporization of relatively large quantities of material and it entails some loss of unreacted materials and of the remaining diluent-refrigerant or refrigerant, as well as potential danger because of the opportunity for escape of explosive vapors into the atmosphere.

The present invention provides a continuous recycling process by which there is a minimum of loss of unpolymerized and auxiliary materials. Broadly, the invention consists of purification and mixing systems for the reactants and the catalyst, to which is connected a polymerization device, provided with means for the introduction of the catalyst and for removal of the reaction heat. There is also provided a polymer recovery member including (if desired) a catalyst quenching means, a belt conveyor system for transporting the polymer separated from the excess diluent-refrigerant and means for washing and purifying the recovered polymer, together with a means for removing the solid polymer from the separating chamber with a minimum loss of gaseous materials; and a condensing and purifying system for the volatile substances as well as separating and other processing means for the polymer.

Thus the invention consists of the process steps, and apparatus members, for mixing the olefinic materials and diluent-refrigerant, a reaction chamber, means for preparing the catalyst and discharging it into the reaction chamber, means for removal of the reaction heat, may include means for quenching the polymerization reaction by the addition of a substance which is reactive with the catalyst, such as an alcohol, aldehyde or alkali and includes a separating mechanism having a closed chamber containing therein a conveyor belt to which the polymerization mixture is delivered, upon which a spray of hot water is discharged to volatilize all of the volatile constituents in the polymerization mixture, leaving behind upon the conveyor belt only the solid polymer, together with an outlet for steam and volatile hydrocarbons, with a condenser for separating the steam from the volatile hydrocarbons as water, a purification system for the separation of the various volatile hydrocarbons and catalyst if a volatile catalyst is used, and means for removing the solid polymer from the separating chamber with a minimum of loss of gaseous hydrocarbons together with means for removing the moisture from the polymer.

Thus an object of the invention is to polymerize an olefinic mixture at low temperature, and to remove the polymer from the system continuously without loss of unpolymerized components of the reaction mixture, while avoiding any danger or industrial hazard from leakage of explosive gases. Other objects and details of the invention will be apparent from the following description when read in connection with the accompanying drawings wherein:

Figure 1 is a diagrammatic view of the apparatus of the invention illustrating the process steps of the invention; and Figure 2 is a perspective view of the polymer separating member of the invention.

This application is a division of my copending application Serial No. 411,440 filed September 19, 1941, now U. S. Patent 2,384,298, dated September 4, 1945.

Referring to the figures, there is provided a chamber member 1 equipped with a plurality of feed lines, 2, 3 and 4, of which feed lines 2 and 3 may be used for the delivery to the mixing chamber, of the various reacting materials such as isobutylene, butadiene, the diluent-refrigerant such as liquid ethylene, if it is used, or a simple diluent such as ethyl or methyl chloride if such is used. The feed line 4 preferably is used for the delivery of recycled material such as recovered and recycled olefinic materials or recovered and recycled diluent-refrigerant, or recovered and recycled diluent.

Adjacent to the mixing chamber 1 is a second mixing system 5 which is used for the preparation of the catalyst. If boron trifluoride is used for catalyst, this may consist merely of a pressure tank containing liquefied boron trifluoride. If aluminum chloride or analogous solid catalyst is used, the member 5 may represent a dissolving and purifying system to which recycled catalyst solvent is delivered through a feed line 6, and fresh catalyst material is delivered through feed line 7. The mixing chambers 1 and 5 are connected, respectively, through transfer lines 8 and 9, to feed measuring pumps 11 and 12 and further transfer lines 14 and 15 to the polymerization reactor 16 which is positioned within the cooling chamber 17. The transfer lines may conduct the streams through coolers (not shown). The polymerization reactor 16 preferably consists of a spaced internal coil of tubing.

Within the chamber 17, surrounding the coil 16, there is positioned the desired refrigerant. If the refrigerant used is liquid ethylene, the chamber is preferably closed and provided with supply and discharge lines as shown. Of these, the feed line 18 may be used for the supply to the chamber 17 of the diluent-refrigerant which may be liquid ethylene, may be liquid propane, or may be other suitable low boiling substances including sulfur dioxide, ammonia and other appropriate refrigerants. When using external cooling, there is normally used a diluent but not a diluent-refrigerant (which acts by vaporizing). A suitable discharge line 19 is provided for the removal of vaporized refrigerant. This line is preferably connected to a compressor and cooling system (not shown) for the recycling of the refrigerant. A drain pipe 21 is also provided for the removal of the diluent-refrigerant in case of need.

In the event that solid carbon dioxide is used as the refrigerant, the top of the chamber 17 may be omitted, or a convenient feed opening may be provided through which to deliver the solid carbon dioxide. For this use, the line 18 is preferably connected to a supply of low freezing liquid such as isopropyl alcohol which serves to convey the heat of reaction from the coil 16 to the solid carbon dioxide. In this instance the line 19 serves for discharge of the volatilized carbon dioxide, and the line 21 serves as a drain for the low freezing liquid. The catalyst transfer line 15 is connected to the coil 16 at several points, one connection being preferably comparatively near to the entrance end of the tube, conveniently about one-quarter of the length of the tube, sufficient length of tube being allowed to permit of the cooling of the mixed olefins to substantially the temperature of the refrigerant in the cooling chamber 17.

The polymerization tube 16 is brought out from the chamber 17 and connected to a quench mixer 22 to which a catalyst quenching material such as ethyl or isopropyl alcohol is supplied by a transfer line 23 and a pump 24 which draws a supply from a feed line 25. The quenched reaction mixture is then delivered through a transfer line 26 into a separatory chamber 27 on to a conveyor belt 28.

The above disclosure shows a coil polymerization system with external cooling, the polymerization occurring within the coil. It is not necessary for this invention that such coil type of cooling system be used. Instead, a pot type of reactor may be used with means for the delivery of the reactant and catalyst thereto, means for the cooling of the reactor, reactant supply means, and means for the outflow of the polymerization mixture with the contained solid polymer. In this embodiment "internal cooling" may be utilized with a sufficient quantity of a refrigerant such as liquid ethylene or liquid methane or solid carbon dioxide to provide the desired low polymerization temperature. The outflow or discharge pipe from any of these alternative reactors may be connected to the pipe 16, as shown in Fig. 1, to deliver the catalyst-containing suspension or slurry to the quenching device 22 and duct 26, and from the duct 26 to the conveyor belt 28.

The conveyor belt 28 may consist of a thin steel or bronze sheet, or may consist of a wire mesh or a fabric mesh, or a "proofed" fabric mesh covered with a substance such as synthetic polymer or other material which does not lose too much of its elasticity at relatively low temperature and is not injured by steam or by the materials being vaporized. Adjacent to the top surface of the belt 28 there is provided a steam and hot water spray 29 supplied through a feed line 31. A discharge line 32 is also provided for the removal of volatilized hydrocarbon substances including any diluent-refrigerant which may have been added in the mixing chamber 1, and any simple diluent which may have been added; as well as the catalyst solvent. The line 32 is connected to a condenser 33 by which vapors from the hot water are condensed and separated in the receiver 35. The volatile hydrocarbon materials are delivered through a transfer line 36 to a purification system 37 from which they are returned through lines 4 and 6, respectively, to the olefin mixing system and catalyst preparing system.

The solid polymer delivered from the transfer line 26 is processed with hot water and steam on the belt 28 and any traces of soluble material such as the quenching alcohol, if isopropyl alcohol is used, and a substantial portion of the quenched catalyst, fall from the belt on the bottom of the separating chamber 27 from which they are withdrawn by a discharge line 38. If isopropyl alcohol is used, it may be recovered by appropriate distillation processes from this waste water. The belt 28 passes through a partition 39 in the separatory chamber 27 through a device shown in greater detail in Figure 2. Beyond the partition 39 there is provided a sealed chamber and an end member 41 to the separating chamber 27. Between the partition 39 and the end member 41 within the sealed chamber, there is provided a pressure of steam or inert gas in excess of the pressure within the chamber 27, which is supplied through a feed line 42. This pressure prevents the passage of combustible or toxic vapors through the partition 39, and results in the delivery of all of the volatile materials through the line 32 to the purification system.

From the sealed chamber the polymer is carried out through the partition 41 on the belt 28 to an exterior roll 43, upon which the solid polymer is disengaged from the conveyor belt 28.

The polymer may then, if desired, be dried by suitable means as shown.

In practicing the invention, the container 1 is filled with the desired isoolefinic material or mixture such as isobutylene, together with a suitable diluent-refrigerant, preferably liquid ethylene, the respective materials being delivered through the pipe lines 2, 3 and 4. Simultaneously, the catalyst container 5 is filled with the desired solution of aluminum chloride or other active halide catalyst, preferably in solution in an alkyl halide such as ethyl or methyl chloride or in carbon disulfide or other suitable solvent to form a catalyst solution. The olefinic mixture is delivered by the pump 11 to the reaction chamber or polymerization tube 16 within the cooling chamber 17, the tube being immersed in a suitable refrigerant, preferably liquid ethylene, within the cooling chamber 17.

Simultaneously, the catalyst solution is delivered through the pipe lines 9 and 15 by the pump 12 to the polymerization coil 16 at convenient points along its length as indicated.

The polymerization occurs in the coil to yield a slurry of solid polymer in the stream of diluent-refrigerant. This slurry is discharged from the lower end of the polymerization tube 16 into a quenching chamber 22, to which a supply of a quenching medium such as methyl, ethyl, propyl or higher alcohol or other oxygenated or alkaline substance is supplied. The alcohol or other quenching substance reacts with the aluminum chloride in the solution to destroy its catalytic power.

This quenching apparently is accomplished by a metathetical reaction which converts the aluminum chloride into an oxygenated or other compound, perhaps a double compound with the alcohol, which is of such low catalytic power, or so wholly lacking in catalytic power, as to prevent the further catalysis of residual polymeric substances during the warming-up operation.

The slurry is then discharged through the pipe line 26 on to the belt 28, where it is washed and brought up nearly to the temperature of boiling water by a spray of hot water and steam delivered from the pipes 29 and 31. The temperature of boiling water or near to this temperature is sufficiently high to volatilize all of the diluent-refrigerant, all of the residual olefinic mixture and all of the catalyst solvent, as well as some of the alcohol if the lower alcohols are used. The residual catalyst and water fall to the bottom of the chamber 27 and are drained away through the drain pipe 38. The polymer is carried between rolls in the partition while on the belt 28 into the sealed chamber 40 within which there is maintained a steam pressure higher than the maximum vapor pressure developed in the chamber 27.

The maintenance of relatively high steam pressure in the sealed chamber 40 causes a steady countercurrent of steam to pass between the rolls in the partition 39 over the polymer, carrying with it the last traces of hydrocarbon substances and carrying all of them upward through the vapor outlet pipe line 32 to the condenser 33 and separatory receiver 35 from which the aqueous liquid portion is drained by way of the pipe line shown and the gaseous or organic liquid portions are led through the pipe line 36 to the purification system 37 for recycling, if desired. Simultaneously, the polymer is passed outward from the sealed chamber 40 through the rolls in the second partition 41, removed from the belt 28 at the roll 43 and the excess moisture removed by appropriate means.

The system above described is particularly advantageous for polymerization reactions in which a partial polymerization only occurs, leaving a substantial quantity of reactants, diluent-refrigerant and catalyst solvent to be removed from the solid polymer, since the system is particularly convenient for the necessary recycling operations.

Alternatively, especially when the polymerization reaction is producing simple polyisobutylene, relatively small amounts only of material remain unpolymerized, especially if solid carbon dioxide is used as the refrigerant, and under these circumstances, recycling is not necessary. The above system is, however, particularly advantageous because of the reduction of industrial and fire hazard by avoiding the discharge of any combustible or poisonous carbonaceous materials into the atmosphere of the workroom.

The above disclosure presents a tube reactor, in which most of the cooling is obtained by a cooling jacket around the reaction chamber. The system of the invention is equally applicable to an overflow reactor in which a mixture of diluent-refrigerant and olefin material is continuously delivered to a reaction chamber such as a reaction kettle, with or without a cooling jacket for refrigerant; and a catalyst is added either to the feed stream or to the rapidly stirred kettle contents, and a continuous output stream of polymer slurry withdrawn to the quenching device and sealed chamber, as shown in the above disclosure. Batch type reactor kettles are readily modified for continuous service by providing an overflow outlet from which the overflow stream is taken to the quenching means and separatory chamber. As the reactor means, it is satisfactory to use a simple jacketed kettle with a stirrer; or a belt conveyor upon which the polymerization reaction occurs may be utilized, or a cardoid type of reaction kettle with power stirring mechanism may also be used.

It should be noted that the device of the invention as above disclosed is particularly advantageous for the making of either solid, semi-solid or liquid polymers. If solid polymers are made, they are present as a slurry in a relatively non-viscous liquid and are readily handled in the device of the invention. In making liquid polymers, they mix with or dissolve in the diluent-refrigerant, if such is used, or remain liquid in the coil if a diluent or diluent-refrigerant is not used, and accordingly are equally readily handled.

Thus the practice of the invention provides a recycle system in which the olefinic materials are mixed, chilled to low temperature, mixed in a polymerization coil with catalyst solution, passed rapidly through the polymerization coil at low temperature to a separating chamber, where unpolymerized olefins, diluent-refrigerants, quenching material and catalyst solvent are separated from the polymer, without loss of volatile organic material, and the solid polymer dried while the gaseous olefinic material, catalyst solvent and quenching material are separated and purified for the preparation of further portions of polymerization mixture and catalyst solvent.

While there is above disclosed but a single embodiment of the device of the invention, it is possible to produce still other embodiments without departure from the inventive concept herein disclosed and defined in the subjoined claims.

The invention claimed is:

1. In the method of separating a solid isoolefinic polymer from liquid components of a polymerization mixture reacted in the presence of a Friedel-Crafts catalyst at a temperature within the range of 0° C. to −165° C. in a reaction zone closed to the atmosphere, the improvement comprising delivering said polymerization mixture from said reaction zone to a treating zone closed to the atmosphere, segregating the solid polymer from the liquid components of the polymerization mixture while conveying the polymer across the treating zone, spraying and washing the solid polymer with water as it is so conveyed removing a stream of the resulting volatilized components and a stream of water from the treating zone, then squeezing said polymer from said treating zone into an enclosed sealing zone wherein an inert gas is maintained at a pressure which exceeds the pressure in the treating zone, thereby preventing the escape of volatile components from the treating zone into the sealing zone, and further conveying the solid polymer through the sealing zone and finally squeezing it out of said sealing zone.

2. In a process for the recovery of solid isoolefinic polymer product from slurries thereof in liquid feed components of polymerized cold reaction mixture comprising isobutylene and prepared in an enclosed reaction zone at a temperature between 0° C. and −165° C. in the presence of a Friedel-Crafts catalyst, the improvement comprising delivering said reaction mixture into an enclosed separating zone, straining said mixture to separate the liquid components from the solid product, supporting and conveying the solid product across said zone while separating a portion of the liquid by straining, washing the solid product with hot water to volatilize a portion of the vaporizable liquid components that remain unseparated from the solid product by straining, withdrawing a stream of volatilized vapors and draining strained liquids from the said separating zone, forcing the separated and washed solid product from the separating zone into an enclosed sealing zone wherein steam is maintained at a sufficiently high pressure to force said steam to pass into said separating zone countercurrent to the direction of travel of the solid polymer product, thereby preventing the passage of volatilized components of the reaction mixture from the separating zone into the sealing zone along with the solid product, and forcing the solid product out of the sealing zone.

3. The process as described in claim 2 wherein said solid polymer product is finally heat-dried.

4. The process as described in claim 1 wherein said inert gas comprises steam.

5. The process as described in claim 1 wherein said inert gas comprises nitrogen.

6. The process as described in claim 1 wherein the inert gas comprises carbon dioxide.

7. In the process of producing dry, solid high molecular weight, olefinic polymers prepared by cooling a polymerizable liquid feed containing isobutylene to a temperature within the range of 0° C. to −165° C. and polymerizing the feed in a reaction zone closed to the atmosphere by addition thereto of a Friedel-Crafts catalyst, the improvement comprising withdrawing from the reaction zone a stream of cold mixture containing residual catalyst, unpolymerized vaporizable feed and solid polymer product, mixing said stream in an enclosed treating zone with hot water, thereby quenching and removing catalyst from the polymer product and also vaporizing unpolymerized feed from the withdrawn stream of reaction mixture, separating the solid polymer product from the hot water, withdrawing a stream of said vaporized feed and a stream containing said hot water from the treating zone, squeeze-passing a stream of particles of the solid polymer product from the treating zone into an enclosed sealing zone wherein steam is maintained under pressure which exceeds the gas pressure in said treating zone, causing a steady counter-current of steam to pass over the stream of polymer as it passes from the treating zone, thereby preventing the escape of volatile feed components from the treating zone into the sealing zone, and squeeze-passing the solid product out of the sealing zone.

ARTHUR DONALD GREEN.

REFERENCES CITED

The following references are of record in the file of this patent:

UNITED STATES PATENTS

| Number | Name | Date |
|---|---|---|
| 2,051,840 | Gerhart | Aug. 25, 1936 |
| 2,138,895 | Wiezevich | Dec. 6, 1938 |
| 2,142,910 | Moncrieff et al. | Jan. 3, 1939 |

FOREIGN PATENTS

| Number | Country | Date |
|---|---|---|
| 483,453 | Great Britain | Apr. 20, 1938 |
| 491,739 | Great Britain | Sept. 8, 1938 |
| 379,029 | Italy | Mar. 5, 1940 |